United States Patent [19]

Yokoo et al.

[11] Patent Number: 5,407,117
[45] Date of Patent: Apr. 18, 1995

[54] TAPE GUIDE FOR A MAGNETIC RECORDING AND/OR REPRODUCING APPARATUS

[75] Inventors: Shouzou Yokoo; Shinro Inui, both of Katsuta; Tsugutaro Ozawa, Mito, all of Japan

[73] Assignee: Hitachi, Ltd., Tokyo, Japan

[21] Appl. No.: 92,915

[22] Filed: Jul. 19, 1993

Related U.S. Application Data

[63] Continuation of Ser. No. 830,301, Jan. 31, 1992, abandoned.

[30] Foreign Application Priority Data

Jan. 31, 1991 [JP] Japan .................... 3-010564

[51] Int. Cl.⁶ .................................. G11B 15/60
[52] U.S. Cl. .................................... 226/190
[58] Field of Search .......... 226/190, 194, 196, 199; 242/76

[56] References Cited

U.S. PATENT DOCUMENTS

| | | | |
|---|---|---|---|
| 3,087,665 | 4/1963 | Thomas | 226/190 |
| 3,276,651 | 10/1966 | Bryer | 226/190 |
| 3,768,717 | 10/1973 | Salcedo | 242/76 X |
| 3,940,043 | 2/1976 | Staples | 226/199 X |
| 4,903,879 | 2/1990 | Noguchi et al. | 226/199 |

FOREIGN PATENT DOCUMENTS

| | | | |
|---|---|---|---|
| 0454584 | 2/1975 | U.S.S.R. | 242/76 |
| 0652610 | 3/1979 | U.S.S.R. | 226/190 |
| 0777732 | 11/1980 | U.S.S.R. | 226/199 |

OTHER PUBLICATIONS

IBM Tech. Dis. Bull., "Compliant Tape Guide", Johnson, vol. 14, No. 2, Jul., 1971.
RCA Tech. Notes No. 728, "Adjustable Tape Guide Roller", Siryj, Jan., 1968.

*Primary Examiner*—Daniel P. Stodola
*Attorney, Agent, or Firm*—Antonelli, Terry, Stout & Kraus

[57] ABSTRACT

A flange of a tape guide has a guide for guiding tape with its circumference, independently of this an adjusting arrangement is provided on a base supporting the flange to allow varying slant of cylindrical portion of the guide, and the flange is pushed to the base. Slant of an upper flange of the tape guide can be adjusted easily and securely. This will not give excessive ruling force to the tape to prevent the tape edges from being damaged.

4 Claims, 4 Drawing Sheets

TAPE GUIDE FOR A MAGNETIC RECORDING AND/OR REPRODUCING APPARATUS

This is a continuation of application Ser. No. 830,301 filed Jan. 31, 1992, now abandoned.

FIELD OF THE INVENTION

The present invention relates to a tape guide for a magnetic recording/or reproducing apparatus, and, more particularly, to a tape guide for a magnetic recording and/or reproducing apparatus for preventing damage to a magnetic tape of the magnetic recording and/or reproducing apparatus.

BACKGROUND OF THE INVENTION

A tape driving system of a magnetic recording and/or reproducing apparatus must accurately move the magnetic tape along a lead provided on a drum to maintain linearity of video tracks. For this purpose, flanges are provided on the tape guides arranged on both sides of the drum. The tape can be moved along the lead on the drum, with the tape being disposed between the upper flange and the lead. Further, another flange is provided on each of the other tape guides between a supply reel and take-up reel in a cassette to govern the tape driving height. This makes the tape move along the lead on the drum easily and at a higher accuracy.

On the other hand, the tape stiffness decreases as the tape thickness is reduced and surface friction coefficient of the tape is increased as the surface characteristics of the tape are improved.

In a conventional magnetic recording and/or reproducing apparatus, the flange of the tape guide has a surface perpendicular to a cylinder axis of the tape guide which governs the tape driving height. An apparatus of the above-noted type is described in, for example, Japanese Patent Application Laid-Open 61-233452. However, with the tape height governed by the planar surface perpendicular to the guide, edges of the tape guided by the flange are deformed or bent, thereby resulting in damage to the tape edges. This is due to the low stiffness of the tape and difference of the flange planar surface from the tape running direction. If, for example, the tape guide is a revolving roller type, the tape may be largely moved up or down even with a slight deviation of the roller revolution direction from the tape running direction, thereby resulting in a large deformation. One of the causes of such a phenomenon is the guiding of the flange on the tape edges even in the area of the tape which is not round on the tape guide as the flange planar surface is larger than the tape guide diameter. The tape is deformed along that area. To avoid this, it has been proposed to conically shape the flange with a small taper angle, so that the height is governed only by a portion on which the tape was wound. It has also been proposed to fix the tape guide so that the guide is not rotatable, with a spacer or the like being inserted between the tape guide and the flange in a direction from a side opposite the side having the tape wound, thereby resulting in a slanting of the flange. With the flange being slanted, the height is governed only on the portion having the tape wound and at the same time, the governing or controlling force is stronger on the center portion of the tape winding and weaker as the tape nears its entrance or exit to prevent deformation of the tape.

In the conical flange construction of the prior art, the flange for governing or controlling the height is parallel to the tape. For this reason, it is difficult for the flange to completely govern or control the tape for parallel movement if the tape guide and the like deviate in accuracy or if the tape running height is deviated. The governing or controlling force tends to be too high in a vicinity of the entrance and exit of the tape winding. That is, the prior art has the disadvantage that the tape is deformed due to the low stiffness of the tape.

In the slant flange construction of the prior art, the tape guide increases a running load of the tape since the tape guide is fixed. This construction has the disadvantage that the thin tape is damaged, or contact of the tape with the head is deteriorated. With the spacer insert, the thickness of the spacer must be determined to prevent the tape from being deformed with respect to accuracy deviation of the tape guide and change of the tape running position due to variation of the tape tension. In this connection, the prior art construction has the problem that, with the insertion of the spacer, it is difficult to control the slant angle of the flange with a high accuracy. Furthermore, if the spacer of a predetermined thickness fails to prevent the tape deformation, the spacer must be replaced by a spacer of a different thickness. Additionally, the running height has to be unnecessarily governed or controlled in the vicinity of the center portion of the tape winding in dependence upon the accuracy of the running path of the tape. If the tape is run for a long period of time or at a high speed in that state, friction of the tape with the flange generates heat, thereby resulting in tape damage.

SUMMARY OF THE INVENTION

In view of the foregoing, it is a general object of the present invention to provide a tape guide that prevents damage to a magnetic tape by deformation, which reduces a running load on the tape, and which minimizes a controlling force on the tape.

Briefly, the foregoing object is accomplished in accordance with the aspects of the present invention by a tape guide for a magnetic recording and/or reproducing apparatus comprising an axle supported on a base, with tape guide rollers for guiding the magnetic tape and being concentrically disposed with respect to the axle. An adjusting base is movable in the axial direction of the axle and engages threads provided on the axle, with a first flange having a guiding surface for guiding a running height of the magnetic tape. First pushing means are supported by the first flange and the axle for pushing the first flange toward the adjusting base, with a second flange pushing the tape guide rollers. Second pushing means are provided between the second flange and the base in a direction of the first flange.

In other words, the present invention is constructed so that a flange of a tape guide includes a guide for guiding tape with its circumference, and an independent adjusting arrangement is provided on a base supporting the flange to allow a varying of a slant of a cylindrical portion of the guide, with the flange being pushed to the base.

The flange of the tape guide is constructed so that a slant of the tape guide can be adjusted with respect to the axis independently of the guide for guiding the tape along the circumference. A height of the flange surface for governing or controlling the height of the edges of the tape, therefore, is adjusted on the circumference of the guide. This allows controlling the governing or controlling force of the tape edges in a way that the governing force can be gradually increased from the beginning of the portion wound around the guide and conversely, it can be gradually reduced. The governing force for the tape can be adjusted in dependence upon dispersion of the tape running path due to tape guide accuracy and tension set errors as the flange slant angle can be adjusted. This means an optimum governing force can be given to the tape.

Further, a spring is provided between an upper flange for controlling the tape edge height and a shaft. The spring can stably hold the upper flange on the screw provided on the adjusting base. An adjusting screw is provided on the adjusting base. The adjusting screw is pushed upward to easily allow the adjusting of the flange height and the slant angle and direction without backlash. A preload spring is provided between a lower flange and the base. The spring provides an optimum preload to a bearing so that the life of the bearing is increased.

The foregoing and other objects, advantages and manner of operation and novel features of the present invention will be understood from the following detailed description when read in connection with the accompanying drawings.

DETAILED DESCRIPTION

Figure 3:
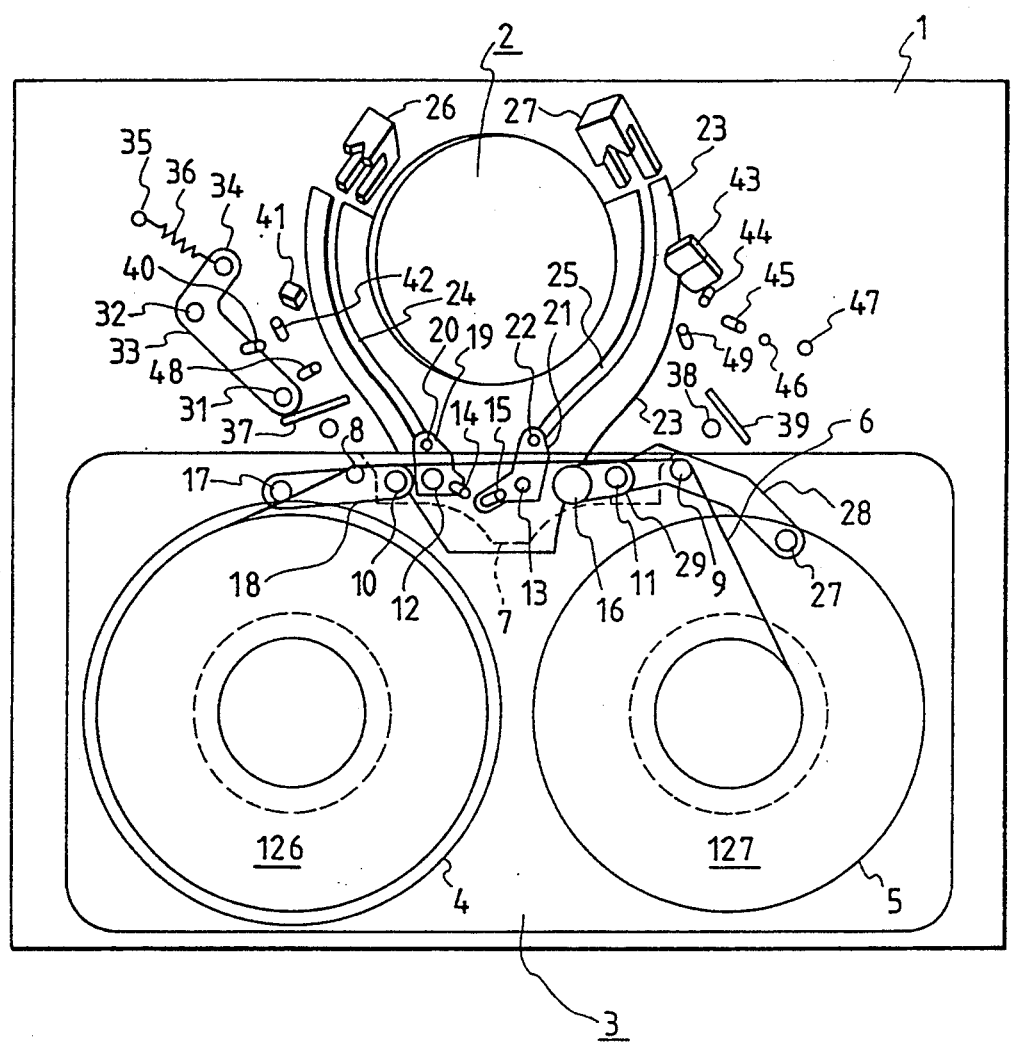
FIG. 3 is a schematic plan view of the magnetic recording and/or reproducing apparatus in an unloaded state.

Referring now to the drawings wherein like reference numerals are used throughout the various views to designate like parts and, more particularly, to FIG. 3, according to this figure, a magnetic recording and/or reproducing apparatus includes a chassis 1 and a drum 2 having a revolving magnetic head installed thereon, with the drum 2 being arranged obliquely on the chassis 1. The apparatus also has a cassette 3 which has a supply reel 4 and a take-up reel 5, with both reels 4, 5 having a magnetic tape 6 of a predetermined length wound thereon. Each of the ends of the magnetic tape 6 has a leader tape connected thereto, with the leader tape being fastened to the supply reel and the take-up reel 5. The cassette 3 has a mouth 7 on its front. The magnetic tape 6 is stretched over guides 8 and 9 around the mouth 7 in the cassette 3. If the cassette 3 is loaded as shown in FIG. 3, the mouth 7 has tape guides 10 and 11, guide rollers 12 and 13, fixed guides 14 and 15, and a pinch roller 16 inserted therein. The tape guide 10 is disposed on an end of arm 18 which is rotatable around an axle 17 mounted on the chassis 1. The guide roller 12 and the fixed guide 14 are based on a base 19 at a predetermined distance from each other. The base 19 also has a positioning pin 20 disposed on a tip thereof. The guide roller 13 and fixed guide 15 are disposed on a base 21 in a fixed relationship, with a pin 22 also being provided on the base 21. The base 19 and base 21 are movable along loading guide grooves 24 and 25 provided on a guide plate 23 fixed on the chassis 1. Both loading guide grooves 24 and 25 have fixing members 26 and 27 provided at ends thereof. The tape guide 11 is fastened on an end of an arm 28 rotatable around its axle disposed on the chassis 1. The pinch roller 16 is based on the other end of an arm 29 rotatable around the axle of the tape guide 11.

The tape loading includes four operations for drawing out the magnetic tape 6 and two operations for governing or controlling a posture of the magnetic tape 6. The tape guide 10 loads the magnetic tape 6 on the supply side upon a turning of the arm 18. The magnetic tape 6 is put on a guide 30 and a tension pin 31 located near the supply reel 4. The tension pin 31 is disposed on an end of an arm 33 rotatable around an axle 32. A spring 36 is disposed between an axle 34 on the other end of the arm 33 and a pin 35, mounted on the chassis 1, forces the arm 33 in a counterclockwise direction. A tape end detector 37 is disposed in a tape driving system between the guide 30 and the tension pin 31. The magnetic tape 6 on the take-up reel 5 side is moved by turning of an arm 288. Furthermore, the end of the tape guide 11 is connected with the pinch roller 16. The magnetic tape 6 is put on a guide 38 located near the take-up reel 5. A tape end detector 39 is arranged near the guide 38. The base 19 and the base 21 are moved along the loading guide grooves 24 and 25 while withdrawing the magnetic tape 6, and are secured by fixing members 26 and 27, respectively, to wind the magnetic tape 6 on the drum 2. The base 19 at the end of the loading is positioned lower than the starting position of the loading. Conversely, the base 21 is made higher. Thus, the guide plate 23 is curved not planar. The drum 2 can be inclined less as compared with a parallel loading type apparatus. A slant guide 40, a fixed head 41, and a fixed guide 42 in the tape driving system are arranged between the tape guide 10 and the guide roller 12. The slant guide 40 inclined at a predetermined angle and direction, is provided for withdrawing the magnetic tape 6 from the supply reel 4 so as to reach the guide roller 12. The fixed head 41 can control or govern winding of the tape on the fixed head 41. The fixed head 41 can erase the signal recorded on the entire width of the magnetic tape 6. The guide rollers is adapted to change the traveling direction of the magnetic tape 6. The fixed guide 14 is provided to lightly guide the magnetic tape 6 to the drum 2. Similarly, there are arranged an A/C (audio/control) head 43, a fixed guide 44, a slant guide 45, guide 46, and a capstan 47 in the tape driving system between the guide roller 13 and the tape guide 11. The A/C head 43 can record or reproduce an audio signal and a control signal for controlling the tape travel. Its tape winding angle is governed or controlled by the fixed guide 44. The slant guide 45 can correct the tape posture to return the magnetic tape 6 wound on the drum 2 to the take-up reel 5. It is inclined that a predetermined angle and direction. The guide 46 is provided to govern the winding of the magnetic tape 6 on the capstan 47. The capstan 47 which, coupled with a motor at a bottom thereof has the pinch roller 16 pressed with the magnetic tape 6 inserted therebetween to drive the magnetic tape 6. The fixed guide 15 changes the posture of the magnetic tape 6 coming out of the drum 2. It positions the tape in the same manner as the cassette together with the slant guide 45.

Tape position controlling guides 48 and 49 are arranged within an inward range of the tape driving system in the unloading state shown in FIG. 3. The guides 48 and 49 are disposed outside of the tape driving system in the loading state shown in FIG. 4 so as not to affect a final traveling of the magnetic tape 6. That is, they are pressed to the magnetic tape 6 during the course of loading or unloading to correct the position of the magnetic tape 6 withdrawn by the guide rollers 12 and 13, thereby imparting no undesirable force to the magnetic tape 6.

Figure 1:
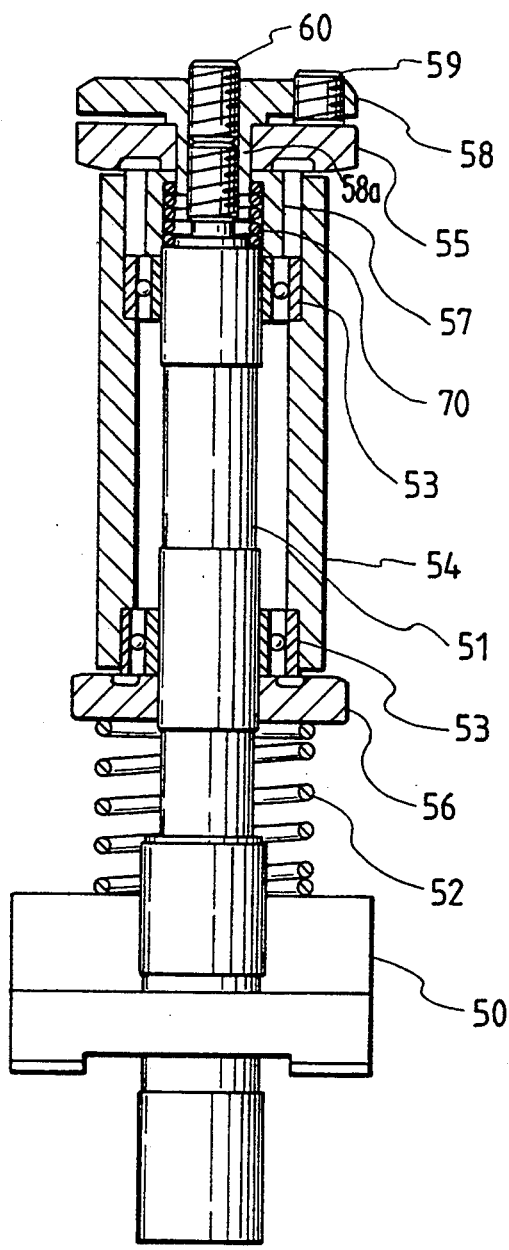
FIG. 1 is a cross-sectional view of an embodiment constructed in accordance with the present invention.
Figure 4:
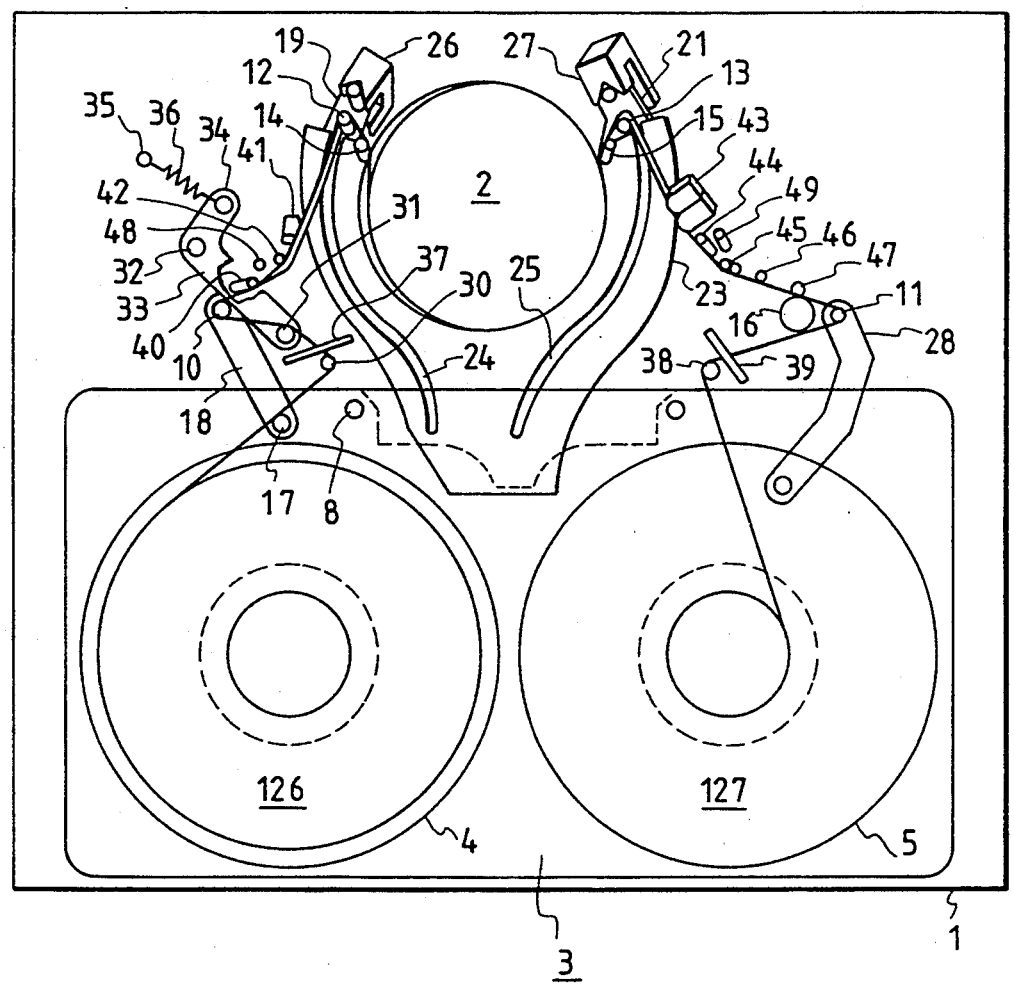
FIG. 4 is a plan view of the apparatus of FIG. 3 in the loaded state.
Figure 5:
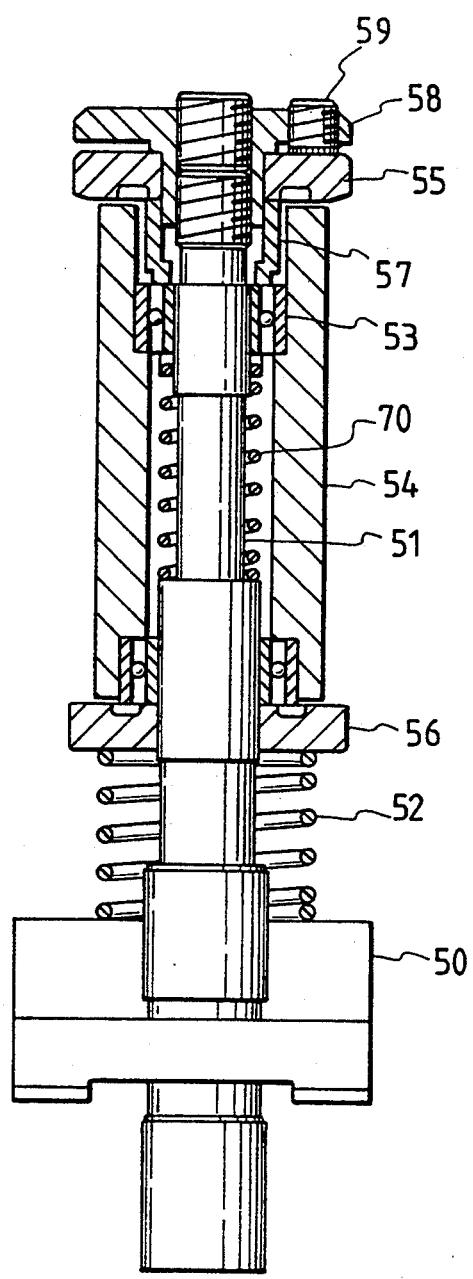
FIG. 5 is a cross-sectional view of another embodiment constructed in accordance with the present invention.

In turn, the following describes a tape guide by reference to FIGS. 1, 4 and 5. It is effective for the tape guide used in the present invention to employ guides for controlling or governing the running height of the magnetic tape 6, for example, to employ the guide roller 12 and 13. Of course, the present invention is not limited to the guide rollers 12 and 13.

As shown in FIG. 1, a shaft 51 is provided on a base 50, with the shaft 51 having a bearing 53 mounted at its upper and lower portions and with each of the bearings 53 rotatably supporting a roller 54. A lower flange 56 is provided below the lower bearing 53. The lower flange 56 is pushed in an upward direction by a preload spring 52 provided below it, thereby providing a predetermined preload to the lower bearing 53. An upper flange 55 is mounted through a sleeve 57 above the upper bearing 53. An adjusting base 58 is provided above the upper flange 55. The sleeve 57 is concentrically mounted on the shaft 51. The adjusting base 58 is aligned with the shaft 51 in such a manner that a tip or projecting portion 58a thereof is fitted into an interior of the sleeve 57, and the upper flange 55 accommodates the projecting portion 58a of the adjusting base 58 so as to enable relative alignment of the adjusting base 58 with respect to the shaft 51. The upper flange 55 is pressed toward the adjusting base 58 by a spring 70 supported by the shaft 51 through the sleeve 57. Further, the shaft 51 has threads on its upper end. A threaded center portion of the adjusting base 58 is threaded on the threads to adjust a height of the roller 54, the upper flange 55, and the lower flange 56 and, at the same time, supports the force of the spring 70 and the preload for the bearing 53 due to the preload spring 52. The adjusting base 58 is adjusted to a predetermined height before being fixed by a screw 60.

Figure 2:
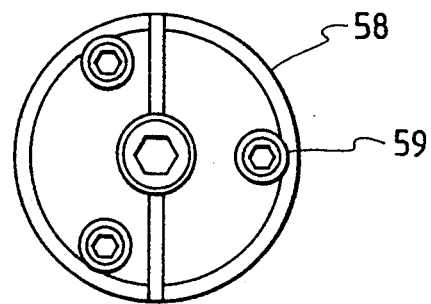
FIG. 2 is a plan view for a tape guide of the present invention.

The adjusting base 58, as shown in FIG. 2, has three substantially equally spaced screw holes disposed at 120° with respect to each other, each of which has an adjusting screw 59 threadably mounted therein. The upper flange 55 is pressed against the adjusting screw 59 by the spring 70 to urge the upper flange 55 in an upward direction. By virtue of the relationship between the adjusting screw 59 and upper flange 55, it is possible to absorb backlash thereby improving a follow-up characteristic movement of the adjusting screw 60 with an inclination of the upper flange 55. The upper flange 55 can be easily inclined in a desired direction by adjusting the adjusting screw 60. The adjusting base 58, as described above, serves to adjust the height of the tape guide. The adjusting screw 60, after adjustment of the height, can be set to a desired winding position of the magnetic tape 6 for the roller 54. This allows the three adjusting screws 59 to incline the upper flange 55 in a desired direction. With the inclination of the upper flange 55, the flange height slant direction is minimum. It is made gradually higher as it deviates from the slant direction. If the inclination of the upper flange 55 is adjusted, for example, toward a center portion of the winding of the magnetic tape 6 for the roller 54, the governing or controlling force of the tape height is the highest at that portion. It is gradually reduced as the inclination deviates from the center portion. In general, as described above, it is best to maximize the governing or controlling force at the center portion of the winding. However, it may occur that the governing or controlling force is too high at a position deviating from the center portion of the winding because of accuracy of the tape driving system or other causes. This results in difference of the possible deformations of the magnetic tape 6 at its beginning and trailing ends of winding. In this event, the slant direction of the upper flange 55 can be adjusted a predetermined degree from the center direction of winding to change the governing or controlling amount of the magnetic tape 6, thereby preventing the deformation of the magnetic tape 6.

In general, it is desirable to adjust the slant direction of the upper flange 55 in a direction away from the position at which the deformation of the magnetic tape 6 is the highest. That is, if the tape deformation is high at the beginning of tape winding, for example, the slant direction of the upper flange 55 should be adjusted toward the end direction of the tape winding.

In the embodiment of FIG. 5, a spring 70 presses an upper flange toward an adjusting base 58 through an inner ring of a bearing 53 provided on an upper portion and a sleeve 57. The bearing 53 has the force exerted by a preload spring 52 alone, so that a service life of the bearing 53 is not reduced.

As described so far, the present invention has the advantage that the upper flange of the tape guide can be securely forced to the adjusting screw provided on the adjusting base. This is effective to simplify the adjustment as the adjusting screw height can be adjusted without backlash. Also, it has the advantage that the life of the bearing is not reduced as the bearing has the optimum preload exerted by the preload spring exclusively provided for the bearing.

It is possible to prevent the tape from being deformed by possible dispersion of the tape driving system as the upper flange inclination can be adjusted. It is also possible to prevent the ends of the tape from being damaged as an excessively high governing or controlling force cannot be applied to the tape. It is further possible to reduce a load on the running tape to increase the tape running reliability as the tape guide can be made rotatable.

What is claimed is:

1. A tape guide apparatus for a magnetic recording and/or reproducing apparatus, the tape guide comprising:
    an axle supported on a base;
    a tape guide roller for guiding magnetic tape, said tape guide roller being concentrically disposed with respect to the axle;
    an adjusting base movable in an axial direction of the axle through a threaded portion provided on the axle for enabling an adjustment of a governing force acting on edges of the magnetic tape;
    a first flange having a controlling surface for controlling a running height of the magnetic tape;
    first means supported by the first flange and the axle for urging the first flange in a direction of the adjusting base;
    a second flange engagable with the tape guide roller;
    second means disposed between the second flange and the base supporting the axle for urging the tape guide roller in a direction of said first flange; and a plurality of height adjusting means provided on the adjusting base for allowing the first flange to be adjusted in a slanted direction.

2. A tape guide according to claim 1, wherein the plurality of height adjusting means comprises threaded holes provided at intervals of 120° along an outermost circumferential portion of the adjusting base, and adjusting fasteners accommodated in the threaded holes.

3. A tape guide according to claim 1, wherein the first and second means respectively include a first spring and a second spring.

4. A magnetic recording and/or reproducing apparatus comprising:

a tape driving system;

at least one tape guide provided on the tape driving system and having an axle supported on a base;

a tape guide roller for guiding magnetic tape, said tape guide roller being concentrically disposed with respect to the axle;

an adjusting base movable in an axial direction of the axle through a threaded portion provided on the axle for enabling an adjustment of a governing force acting on edges of the magnetic tape;

a first flange having a controlling surface for controlling a running height of the magnetic tape;

first means supported by the first flange and the axle for urging the first flange in a direction towards the adjusting base;

a second flange engagable with the tape guide roller; and second means provided between the second flange and the base supporting the axle for urging the tape guide roller in a direction of said first flange; and a plurality of height adjusting means provided on the adjusting base for allowing the first flange to be adjusted in a slanted direction.

* * * * *